United States Patent
Michnik et al.

(10) Patent No.: US 7,878,110 B1
(45) Date of Patent: Feb. 1, 2011

(54) ADJUSTABLE LOCK AND DRAIN APPARATUS

(76) Inventors: Alisa Michnik, 23 Clemson Rd., Cherry Hill, NJ (US) 08034; Yefim Michnik, 23 Clemson Rd., Cherry Hill, NJ (US) 08034

( * ) Notice: Subject to any disclaimer, the term of this patent is extended or adjusted under 35 U.S.C. 154(b) by 870 days.

(21) Appl. No.: 11/482,390

(22) Filed: Jul. 7, 2006

(51) Int. Cl.
*A47J 37/12* (2006.01)
*A47J 27/08* (2006.01)
*B01D 29/88* (2006.01)

(52) U.S. Cl. .............. 99/410; 99/337; 210/464

(58) Field of Classification Search ........... 99/337, 99/339, 342, 410, 427, 504; 210/464, 465, 210/466, 473, 474, 477
See application file for complete search history.

(56) References Cited

U.S. PATENT DOCUMENTS

| | | | | |
|---|---|---|---|---|
| 1,259,183 A * | 3/1918 | Wildy | ............... | 222/189.07 |
| 2,303,841 A * | 12/1942 | Kircher | ............... | 222/545 |
| 3,289,849 A * | 12/1966 | Livingston et al. | ............... | 210/469 |
| 4,310,418 A * | 1/1982 | Busbey | ............... | 210/467 |
| 5,615,607 A * | 4/1997 | Delaquis et al. | ............... | 99/409 |
| 5,653,881 A * | 8/1997 | Bruss et al. | ............... | 210/467 |
| 5,730,045 A * | 3/1998 | Delaquis et al. | ............... | 99/337 |
| 6,536,603 B1 * | 3/2003 | Sollo | ............... | 210/469 |
| 6,568,314 B1 * | 5/2003 | Stepanova | ............... | 99/340 |
| 6,789,683 B1 * | 9/2004 | Fisher | ............... | 210/465 |
| 7,431,851 B2 * | 10/2008 | Chan | ............... | 210/800 |
| 2004/0216620 A1 | 11/2004 | Quiggins | | |

* cited by examiner

*Primary Examiner*—Tu B Hoang
*Assistant Examiner*—Hemant Mathew

(57) ABSTRACT

An apparatus which serves as a single utensil allowing to gradually adjust vapor escape, liquid drainage speed, and particle drainage and filtering. A few of the apparatus applications are cooking utensils, pitchers, drinking cups, gardening watering and fertilizing cans, etc. The apparatus comprises a vessel having pouring regions and a lid having draining and solid regions. In use, the solid regions of the lid must be aligned with the vessel pouring regions, which is the non-straining or opened position with no vapor release. If the lid is rotated in either direction, it slides into a locking engagement with the vessel until the desired draining regions of the lid are aligned with the vessel pouring regions. This is the straining or locked position where a desirable degree of steam or liquid and particles can be released.

7 Claims, 17 Drawing Sheets

ADJUSTABLE LOCK AND DRAIN APPARATUS

BACKGROUND OF THE INVENTION

1. Field of the Invention

This invention relates to a field of cookware or any other field, where specifically, an ability to gradually adjust amount of particle drainage and vapor or liquid release is required.

2. Background of the Invention

The present invention is an adjustable draining apparatus which can be used for different applications. For instance, some of the applications are pitchers, drinking cups, gardening watering and fertilizing cans, etc. For exemplary purpose, a cooking application will be described herein.

Preparation of foods such as pasta, meat, and vegetables often requires an individual to cook the food in liquid while releasing desired amount of steam and then straining the food items. For example, pasta is first boiled in water and then strained to be separated from the liquid. Another example is the preparation of ground meat. While browning the ground meat, liquid fat produced must be drained before the meal can be served. In other examples, certain foods such as vegetables require different amounts of steam being released depending on the texture of the vegetables desired. For example, cooking very tender broccoli requires very little steam release while crisp broccoli requires a large amount of steam release.

Commonly, an individual uses multiple kitchen utensils by cooking food in one utensil, releasing steam with a second utensil, and straining with a third separate utensil. However, using separate cooking utensils adds inconvenience in food preparation. Moreover, additional utensils take up more space in storage and dishwasher. Another typical occurrence is when a strainer is unavailable. In this case, one of the common options is to handle the lid as a barrier while straining. This creates a dangerous situation with the risk of being burned from uncontrollable escape of hot liquid and steam. Furthermore, this alternative may result in the escape of food.

There have been attempts in the prior art to fix these problems by combining a cooking vessel and a strainer into a single kitchen utensil.

For example, U.S. Pat. No. 5,653,881 issued on Aug. 5, 1997 to Bruss, discloses a single utensil that combines the features of a cooking vessel with those of a strainer.

U.S. Pat. No. 5,730,045 issued on Mar. 24, 1968 to Delaquis, discloses a pot and lid that can be securely integrated to function as a strainer.

However, these prior art vessel draining systems are limited in their draining capabilities. More particularly, since the locking position is fixed in the Bruss and the Delaquis devices, the amount of drainage is fixed and is limited to the size of the draining region.

Consequently, there is a need for cookware that provides an ability to adjust the desirable degree of vapor escape and drainage of liquid and food particles.

OBJECTS OF THE INVENTION

Accordingly, several objects and advantages of the present invention are:

To provide a draining device allowing to vary the adjustment of vapor escape, speed of liquid drainage, and particle filtering.

To provide a reliable lid that locks to the vessel in any position where the draining regions are aligned with the vessel pouring regions.

To provide a device allowing to seal the content to prevent vapor escape in the opened position.

To provide a safe device that protects the user from explosions by unlocking the lid from the vessel when vapor escape is blocked.

To provide a device with clear indication whether the lid is locked or not.

To provide a draining device that is easy to use with minimal strength and use of hands by providing a lid which automatically locks to the vessel.

To provide a draining device that is convenient to use by allowing the user to drain without using hands while attending to other matters.

Further objects and advantages of this invention will become apparent from a consideration of the drawings and ensuing description.

SUMMARY OF THE INVENTION

The object of the present invention is to provide a single utensil that combines the features of a cooking vessel with those of a strainer adapted to safely drain liquid and/or food particles with a capability to gradually adjust amount of drainage and vapor escape. This invention achieves this while overcoming the disadvantages of the prior art devices.

A cooking application of the present invention includes a vessel having pouring regions and a lid having draining and solid regions to facilitate drainage and vapor escape.

In use, the lid is placed on the vessel so that the lid solid regions are in communication with the vessel pouring regions. This is an unlocked position (non-straining position) where the lid is not locked to the vessel enabling the individual to cook without vapor escape. At the same time, if the pressure is too high, and since the lid is not locked, it will allow for vapor escape and will not cause an explosion.

Once the vessel is ready for draining, the lid is rotated in either direction until the desirable draining regions of the lid are aligned with the vessel pouring regions. Whenever the draining regions of the lid are in communication with the vessel pouring regions, the lid is automatically in the locked position. Since the lid is locked in place, the individual can place his or her hands on the vessel or vessel handles to pick up the vessel and drain without having to hold the lid in place. The vessel can also be placed upside down for draining, permitting the individual to attend to other matters meanwhile.

DETAILED DESCRIPTION OF THE INVENTION

This invention comprises a vessel, sealing means for sealing the vessel, and means for adjusting the amount of drainage and vapor escape. The vessel can be of any size, type, and shape including, but not limited to a container, a pot, a pan, or a skillet used to contain, store, prepare, or cook items. The sealing means can be of any size and type including, but not limited to a lid, a cover, a top, or a cap. The sealing means can also be of any shape including, but not limited to flat, nested inwardly, domed, etc. For illustrative purposes, the vessel is described herein as a pot, the sealing means are described herein as a lid, and the adjustment means are described herein as a relative position of the lid and the pot.

In general, a pot includes a pot wall with a pot rim through which contents can be placed in the pot. The pot has one or more pouring regions. A pouring region is an opening in the pot wall to facilitate drainage and vapor escape. The pouring region opening can be of any shape to provide adequate drainage and vapor escape. The pouring region may include a lip extending outwardly from the pot wall next to the pouring region to facilitate direct drainage and vapor escape. The lip can be of any shape as long as it provides adequate direction of drainage and vapor escape. For example, pouring region lips are demonstrated in FIGS. 1C-1E.

Handles for the pot and the lid are not mandatory. If handles are used, as long as they support the adjustment of drainage and vapor escape, their number, types, and positions are dictated only by the purpose of the application. For illustrative purposes, pot handles are demonstrated in FIGS. 7-9 and lid handles are demonstrated in FIGS. 2A-4E and 6A-9.

There are five sample pot embodiments described herein.

Figure 1A:
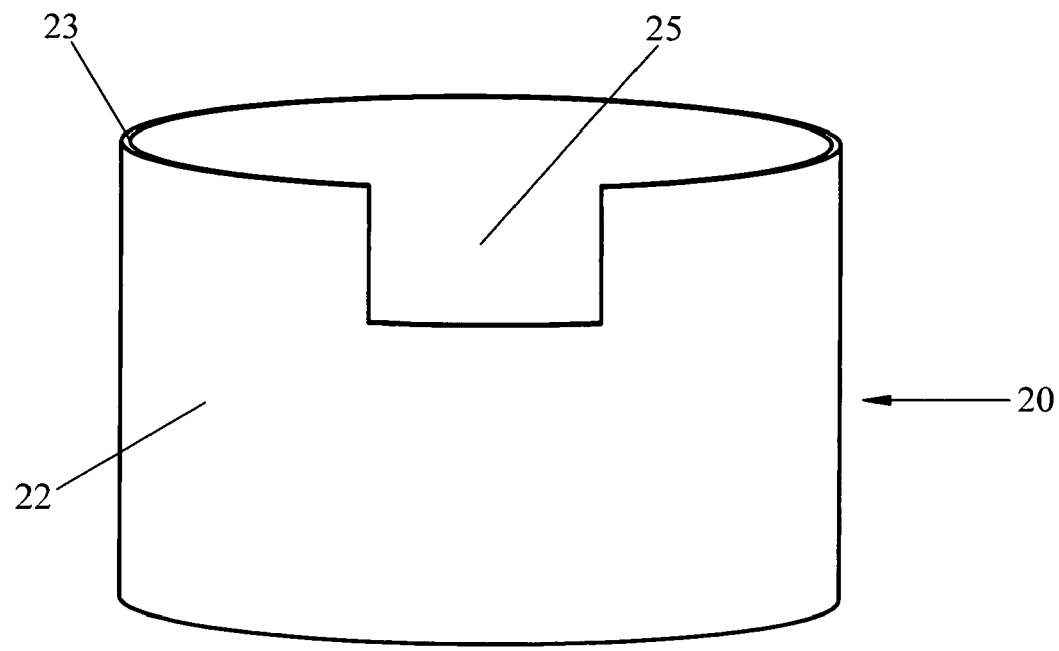
FIG. 1A shows a perspective view of the pot first embodiment.

The pot first embodiment illustrated in FIG. 1A includes pouring region opening 25 in the pot wall 22 from the pot rim 23 down.

The pot second embodiment illustrated in FIG. 1B includes a cutout 28 in the pot rim 23 circumference and pouring region opening 25 in the pot wall 22 below the cutout 28.

Figure 1B:
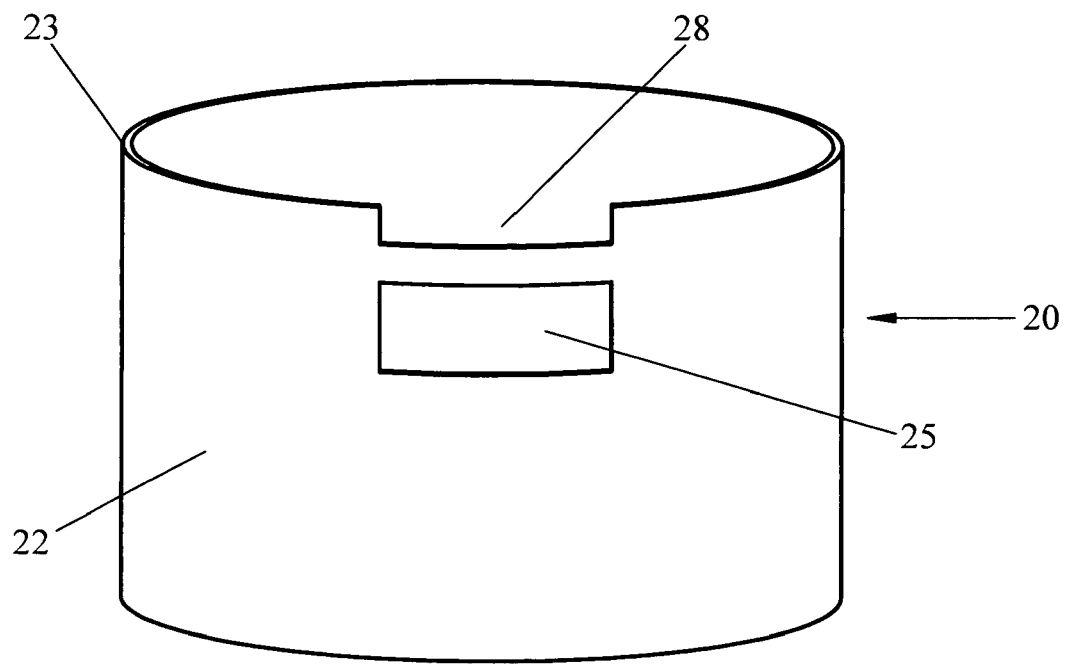
FIG. 1B shows a perspective view of the pot second embodiment.
Figure 1C:
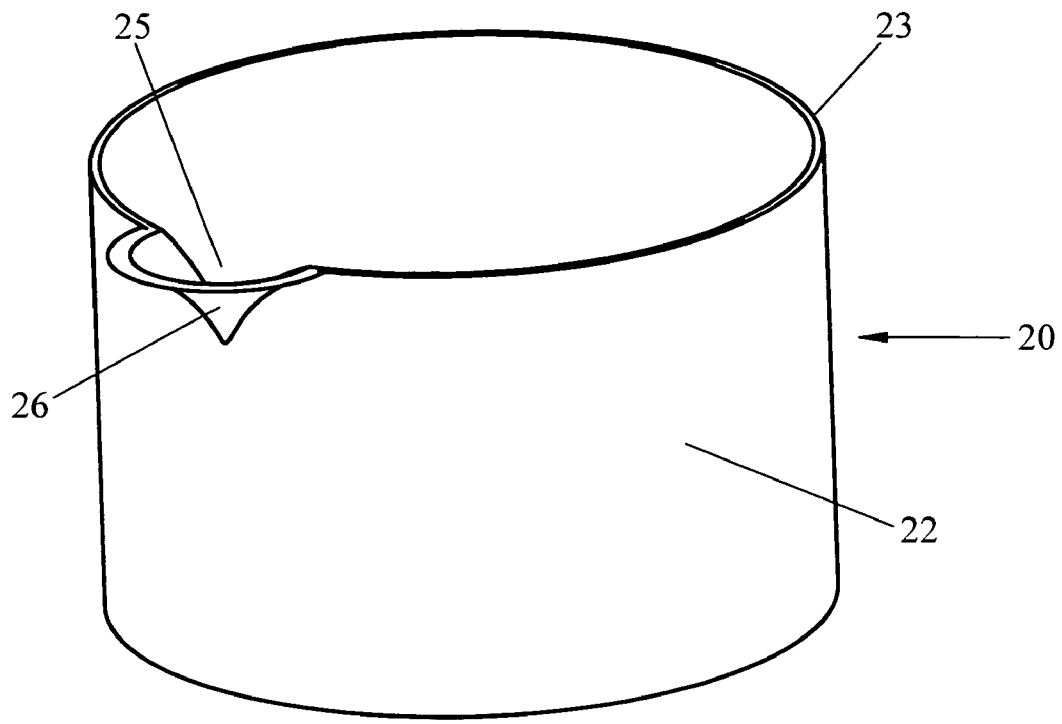
FIG. 1C shows a perspective view of the pot third embodiment.

The pot third embodiment illustrated in FIG. 1C includes pouring region opening 25 in the pot wall 22 from the pot rim 23 down with the pouring region lip 26 enclosing the pouring region opening 25.

Figure 1D:
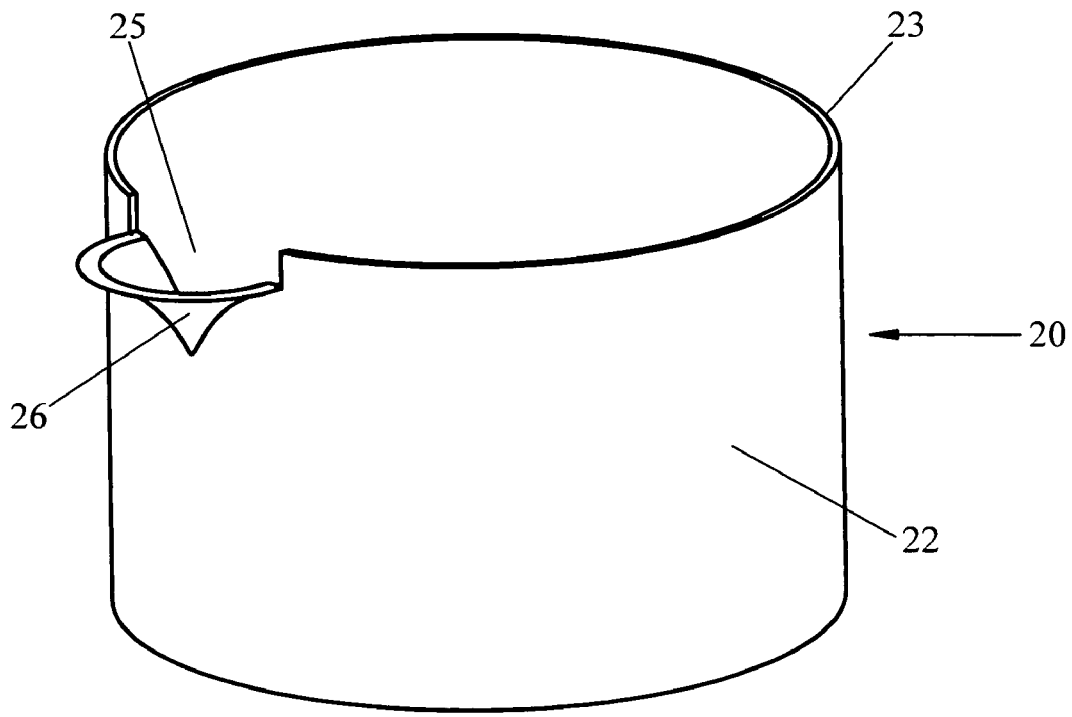
FIG. 1D shows a perspective view of the pot fourth embodiment.

The pot fourth embodiment illustrated in FIG. 1D includes pouring region opening 25 in the pot wall 22 from the pot rim 23 down with the pouring region lip 26 enclosing the bottom portion of the pouring region opening 25.

The pot fifth embodiment illustrated in FIG. 1E includes cutout 28 in the pot rim 23 circumference and pouring region opening 25 in the pot wall 22 below the cutout 28 with the pouring region lip 26 enclosing the pouring region opening 25.

In general, a lid includes functional units. Each of the functional units includes one draining and one solid region. The draining region includes a set of openings of the same or various shapes and sizes to facilitate draining and vapor escape when aligned with the pot pouring region. The solid region prevents draining and vapor escape when aligned with the pot pouring region. The number of functional units must be larger or equal to the number of pot pouring regions. The functional units must be located on the lid in such a way that all the pot pouring regions can be blocked by the functional units' solid regions when necessary. The lid is operable between an opened and a locked position. In the opened position the lid can be removed from the pot and can be placed on the pot rim causing the lid solid regions to be aligned with the pot pouring regions. In the locked position the lid is positioned on the pot and the lid draining regions are aligned with the pot pouring regions.

There are two sample lid embodiments described herein.

Figure 2A:
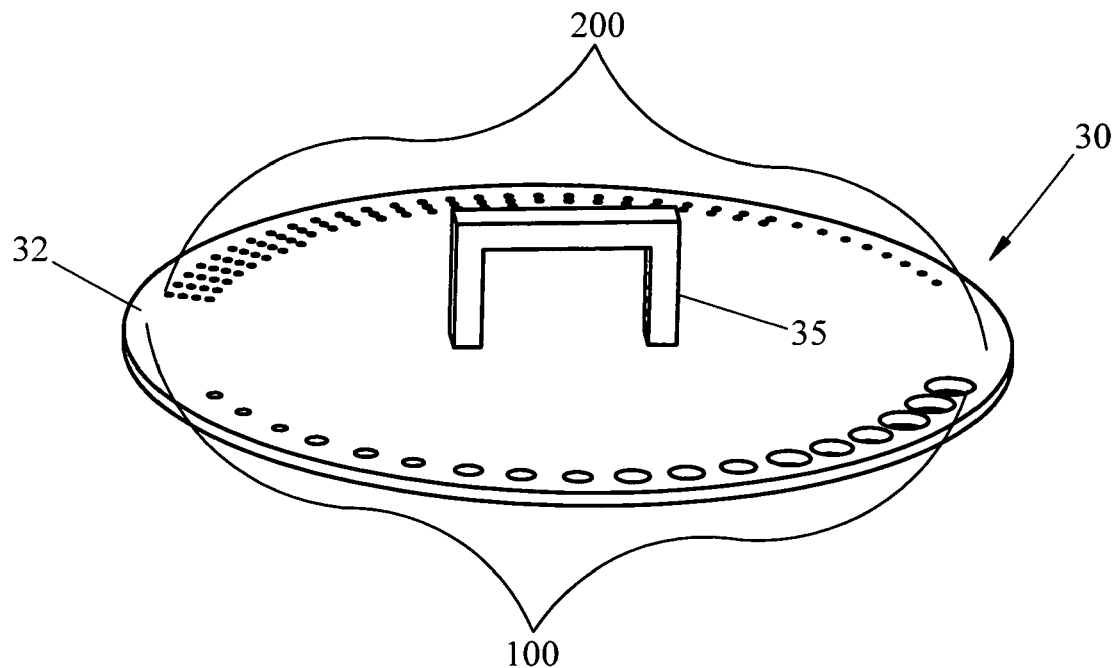
FIG. 2A shows a perspective upward view of the lid first embodiment.
Figure 2B:
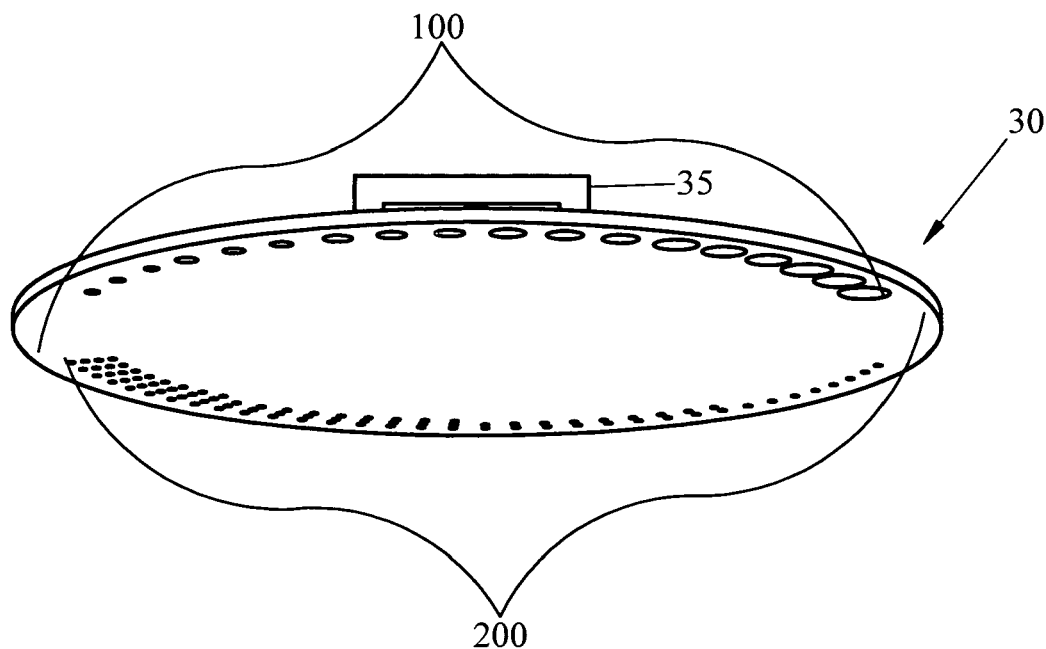
FIG. 2B shows a perspective downward view of the lid first embodiment.

The first lid embodiment is illustrated in FIGS. 2A and 2B where functional units 100 and 200 (best seen in FIG. 3) are located on the lid periphery 32. For exemplary purposes lid handle 35 is depicted in the center of the lid 30.

Figure 3:
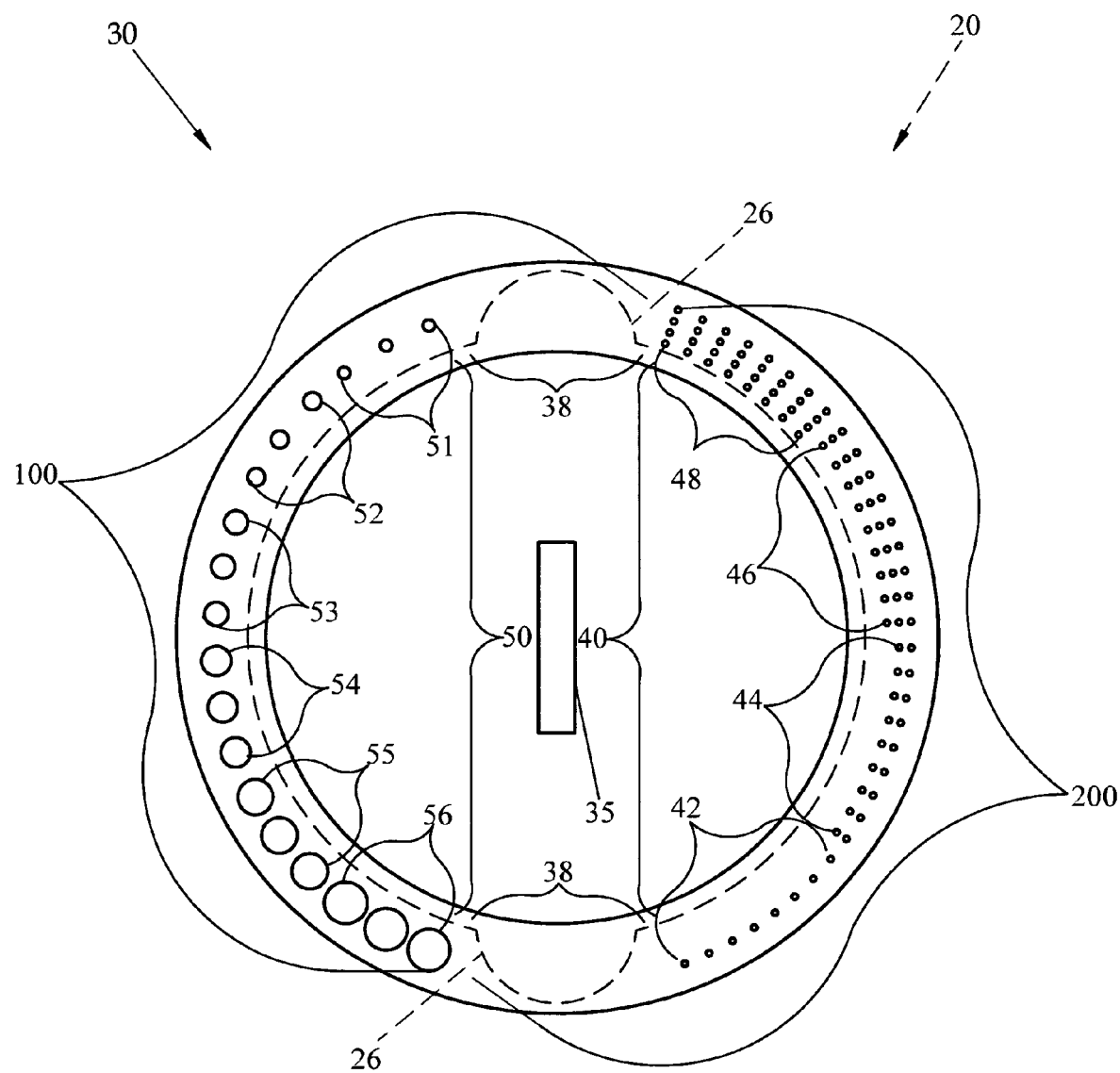
FIG. 3 is demonstrating functional units in a top view of the lid depicted in FIGS. 2A and 2B placed on top of the pot depicted in FIG. 1C.

FIG. 3 illustrates functional units for the first lid embodiment. The lid 30 is sized to cover the pot pouring region lips 26 in order to be able to position the draining regions 40 and 50 and the solid regions 38 over the pot pouring region lips 26. Although, two pot pouring region lips 26 and two functional units 100 and 200 are depicted, more can be made if desired. Functional unit 100 comprises a solid region 38 and a draining region 50. For exemplary purposes, the draining region 50 comprises a set of draining sections gradually increasing from the smallest 51 to the largest 56. Each draining section 51 to 56 includes a fixed number of identical size holes (for exemplary purposes, three holes are depicted in a draining section). When the lid 30 is on the pot 20 and the draining region 50 is aligned with the pot pouring region lip 26, any three adjoining holes of the same or neighboring draining sections can be positioned to be aligned with the pot pouring region lip 26 for desirable drainage, vapor escape, or particle filtering. Functional unit 200 comprises a solid region 38 and a draining region 40. For exemplary purposes, the draining region 40 comprises a set of four multiple draining sections, gradually decreasing from the most dense 48 to least dense 42. Each draining section 42 to 48 includes the same size small holes utilized to retain most of the particles while being able to adjust the amount of liquid drainage and vapor escape.

No matter how the lid 30 is positioned on the pot 20, the amount of drainage and vapor escape of the draining region 50 will approximately correspond to the amount of drainage and vapor escape of the draining region 40 at any locked position and can be adjusted gradually. For instance, aligning the largest draining section 56 with the pot pouring region lip 26 will result in the opposed most dense draining section 48 to be positioned against the other pot pouring region lip 26 and will result in maximum amount of drainage and vapor escape. Aligning the smallest draining section 51 with the pot pouring region lip 26 will result in the opposed least dense draining section 42 to be positioned against the other pot pouring region lip 26 and will result in minimum amount of drainage and vapor escape.

Draining regions 40 and 50 allow for gradual adjustment of vapor escape and the speed liquid can be drained. While draining region 40 is dedicated for retaining only the smallest particles when draining liquid, the draining region 50 is dedicated for selecting the size of the particles to be removed. While adjusting for desirable drainage and vapor escape, the lid 30 is capable of being rotated by the full 360 degrees making it no difference which rotational direction is used when setting the desired draining regions 40 and 50 against the pot pouring regions.

The shape, size, and position of draining region openings can vary from simple holes and rectangles to text messages and/or images desired. The only requirement is the cumulative increase in size of the corresponding openings along the perimeter of each draining region in order to allow for gradual adjustment of drainage and vapor escape.

Figure 2C:
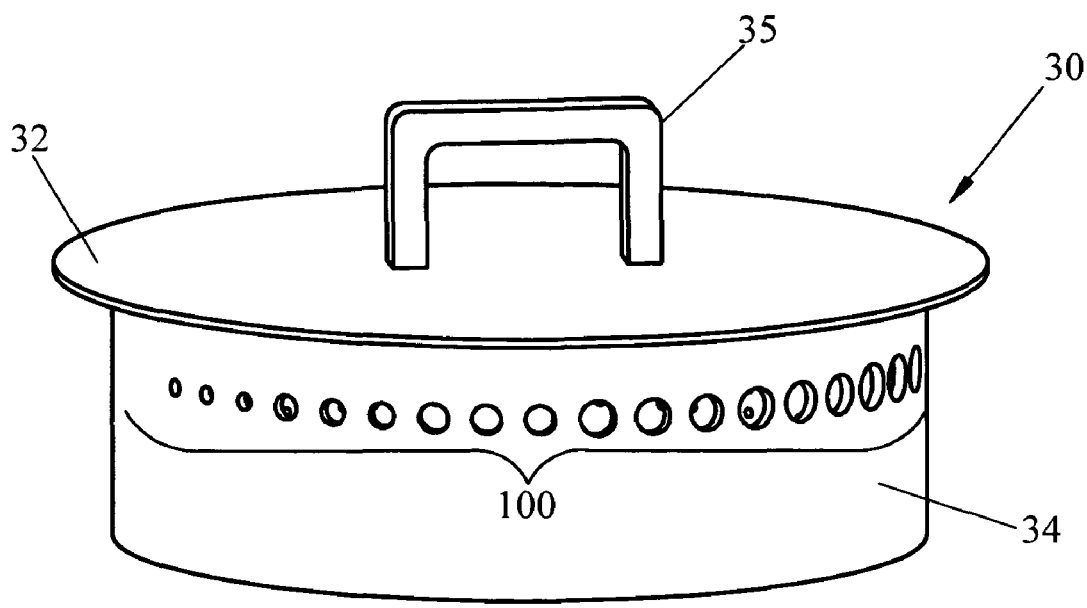
FIG. 2C shows a perspective upward view of the lid second embodiment.
Figure 2D:
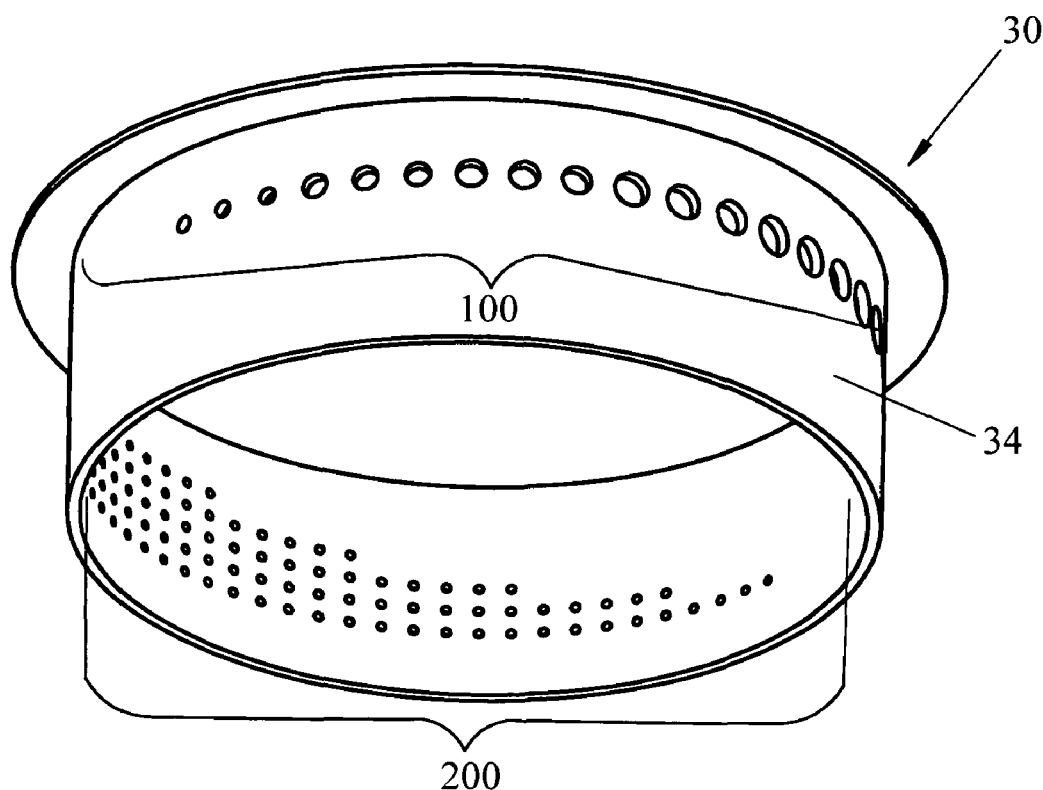
FIG. 2D shows a perspective downward view of the lid second embodiment.

The second lid embodiment is illustrated in FIGS. 2C and 2D where functional units 100 and 200 are located on a lid skirt 34. The lid skirt 34 is a flange located inside of the lid periphery 32. Functional units 100 and 200 for the second lid embodiment are laid out in the same fashion on the lid skirt 34 as the functional units 100 and 200 of the first lid embodiment (FIGS. 2A and 2B) layout on the lid periphery 32.

In the second lid embodiment, the lid is sized to cover the pot rim only, since the lid skirt is adapted to slidably engage with the inner sides of the pot wall and is responsible for positioning the draining and solid regions against the pot pouring region openings or the pot pouring region lips.

The lid is automatically locked to the pot when the lid draining regions are aligned with the pot pouring regions for draining or allowing vapor to escape. There are five sample automatic locking mechanism embodiments described herein.

Figure 4A:
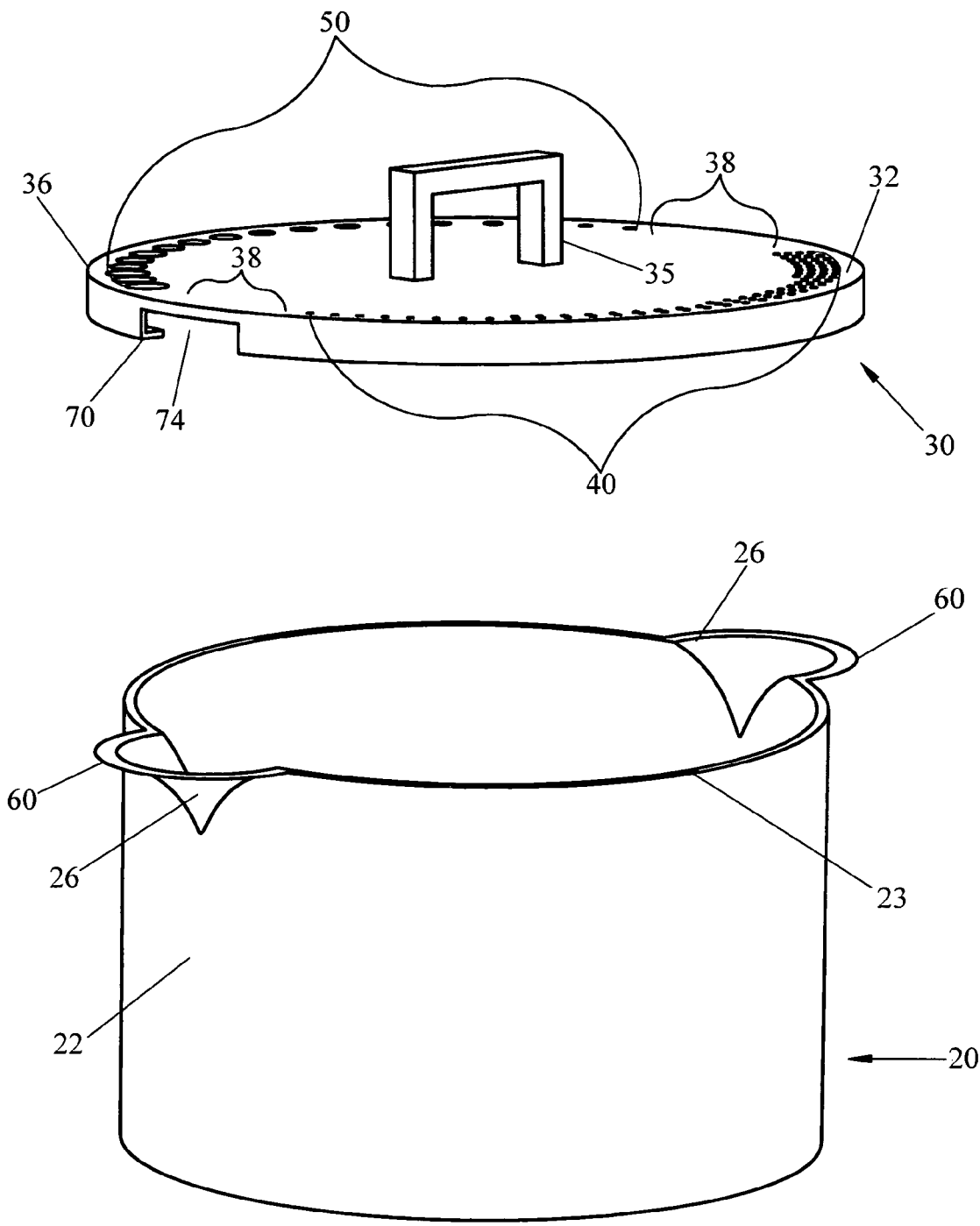
FIG. 4A shows a perspective view of the pot and the lid locking mechanism first embodiment.

The first embodiment of the automatic locking mechanism is illustrated in FIG. 4A. It applies to the lid embodiment illustrated in FIGS. 2A and 2B and the pot embodiment illustrated in FIG. 1C. The pot locking component includes flanges 60 extending outwardly from the pot pouring region lips 26. The lid locking component includes a flange 70 inwardly extending from the lid rim 36. The lid locking flange 70 includes cutouts 74. The positions of the lid cutouts 74 must correspond to the positions of the pot locking flanges 60 for the locking mechanism to work. Although FIG. 4A illustrates only two such pot pouring region lips 26, more than two can be made if desired. In the opened position, the lid 30 is placed on the pot 20 in such way that the lid locking flange 70 does not interfere with the pot locking flanges 60 due to the lid locking flange cutouts 74. This way, the lid 30 seals the pot 20 at the pot rim 23 level resulting in the lid periphery solid regions 38 to be aligned with the pot pouring region lips 26. Rotation of the lid 30 in any direction will result in the pot locking flanges 60 being disposed inside of the lid locking flange 70, locking the lid 30 to the pot 20, and alignment of the lid periphery draining regions 40 and 50 and the pot pouring region lips 26.

Figure 4B:
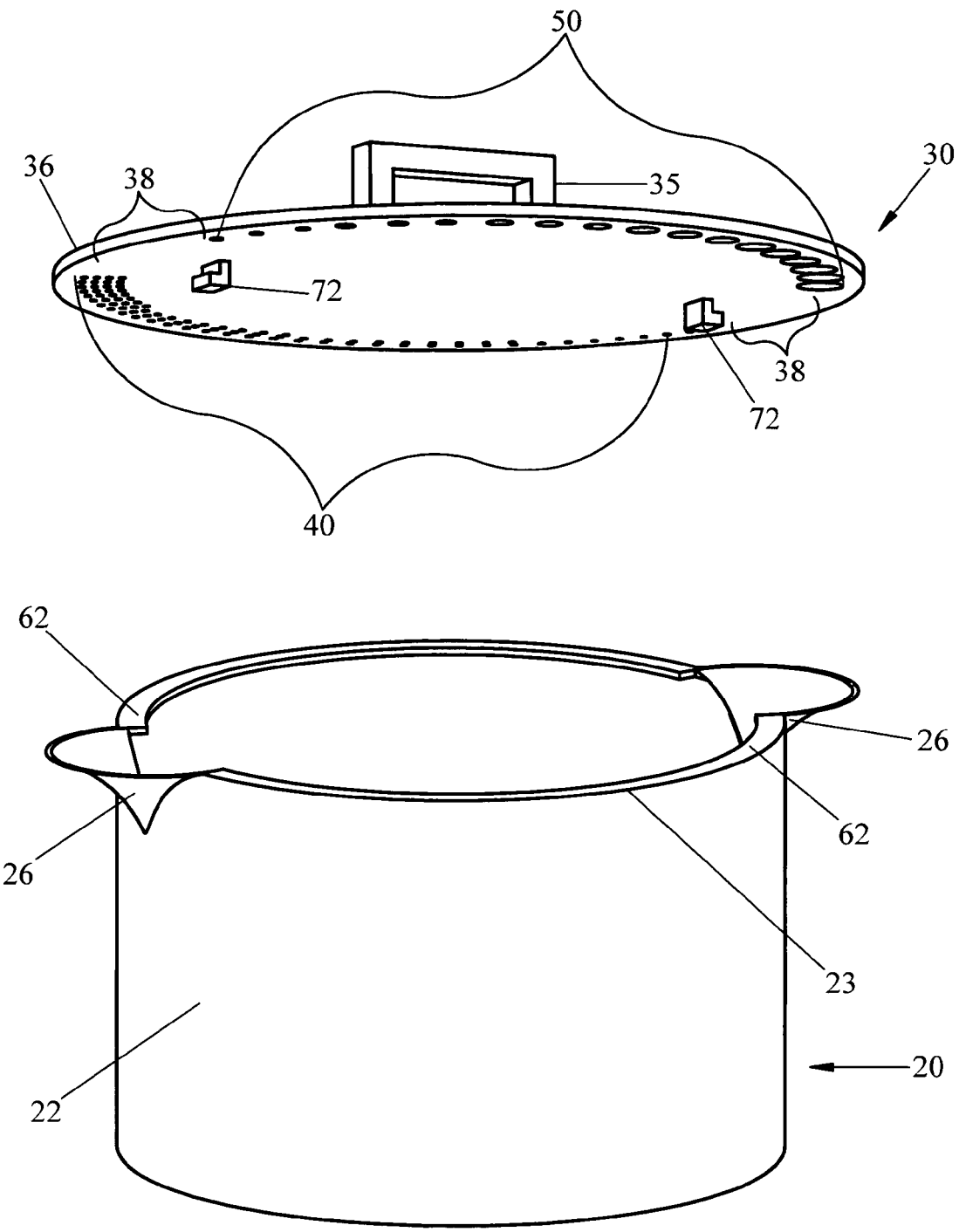
FIG. 4B shows a perspective view of the pot and the lid locking mechanism second embodiment.

The second embodiment of the automatic locking mechanism is illustrated in FIG. 4B. It applies to the lid embodiment illustrated in FIGS. 2A and 2B and the pot embodiment illustrated in FIG. 1C. The lid locking component includes flanges 72 outwardly extending from the bottom of the lid 30 and positioned slightly away from the lid rim 36. The pot locking component includes flanges 62 inwardly extending from the pot rim 23. The number of the pot pouring region lips 26 and their positions must correspond to the number and positions of the lid locking flanges 72 for the locking mechanism to work. Although FIG. 4B illustrates two lid locking flanges 72 and two pot pouring region lips 26, more than two can be made if desired. In the opened position, when the lid 30 is placed on the pot 20, the lid locking flanges 72 are positioned inside of the pot pouring region lips 26, resulting in the lid periphery solid regions 38 to be aligned with the pot pouring region lips 26. Rotation of lid 30 in any direction will position the lid locking flanges 72 inside of the pot rim flanges 62 resulting in locking the lid 30 to the pot 20 and alignment of the lid periphery draining regions 40 and 50 and the pot pouring region lips 26.

Figure 1E:
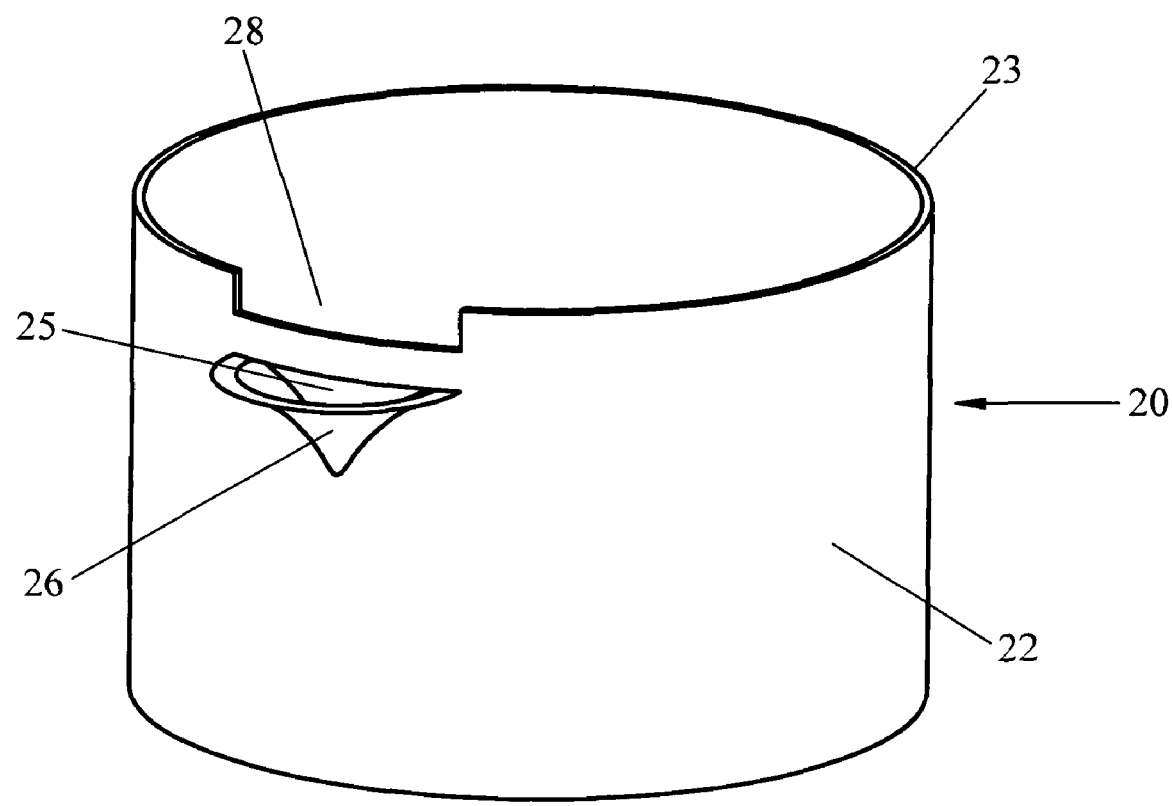
FIG. 1E shows a perspective view of the pot fifth embodiment.
Figure 4C:
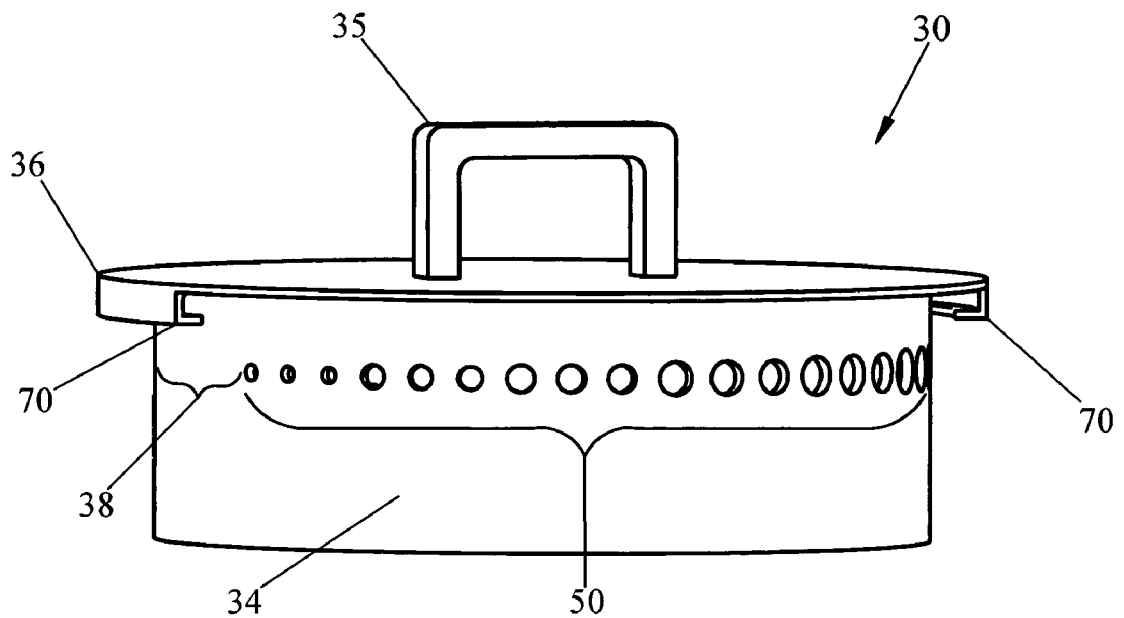
FIG. 4C shows a perspective view of the pot and the lid locking mechanism third embodiment.
Figure 4C:
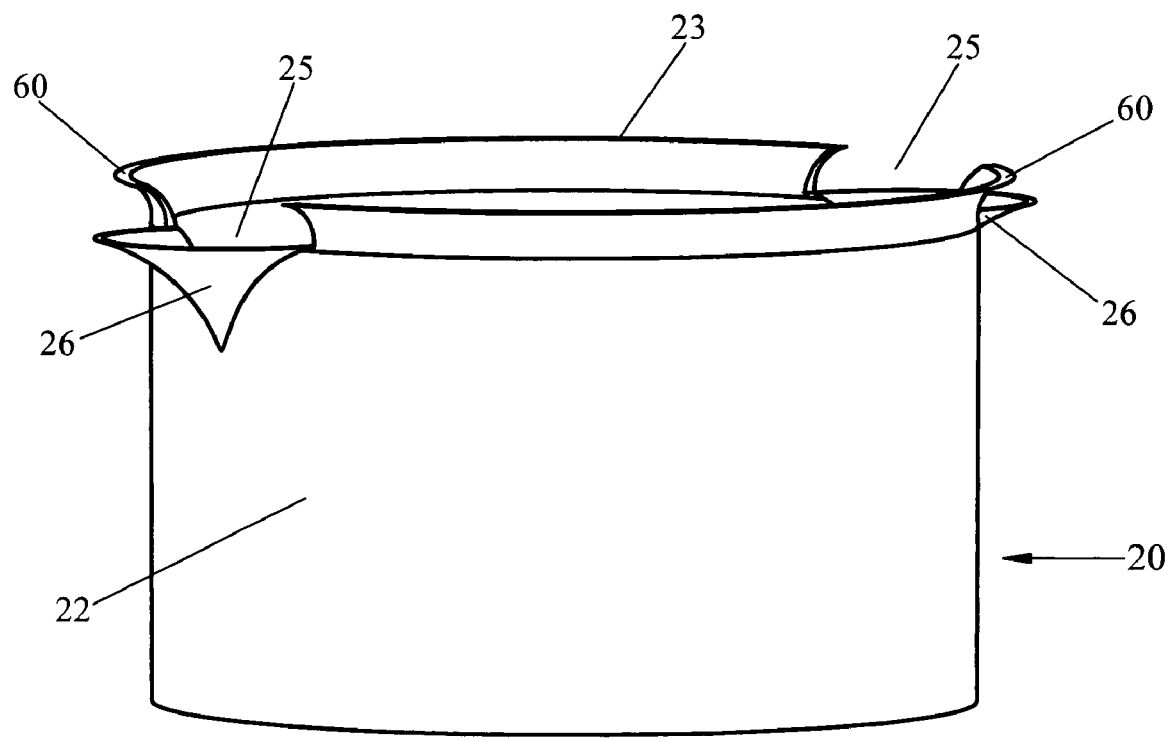

The third embodiment of the automatic locking mechanism applies to the lid embodiment illustrated in FIGS. 2C and 2D and the pot embodiments illustrated in FIGS. 1A, 1B, 1D, and 1E. FIG. 4C illustrates an example of this embodiment which includes the locking mechanism of the lid depicted in FIGS. 2C and 2D and the pot depicted in FIG. 1D. The lid locking component includes flanges 70 inwardly extending from the lid rim 36. The pot locking component includes flanges 60 outwardly extending from the pot rim 23. The pot pouring regions can be located at the pot rim 23 as illustrated in FIGS. 1A and 1D or below the pot rim 23. If the pot pouring regions are located below the pot rim 23 as illustrated in FIGS. 1B and 1E, the pot rim cutouts 28 are necessary above the pot pouring regions. The number of the pot rim cutouts 28 or the pot pouring region openings 25 and their positions must correspond to the number and positions of the lid locking flanges 70 for the locking mechanism to work. Although FIG. 4C illustrates two lid locking flanges 70 and two pot pouring region openings 25, one or more than two can be made if desired. In the opened position, when the lid 30 is placed on the pot 20, the lid skirt 34 is nested inside of the pot wall 22 with the lid locking flanges 70 positioned inside of the pot rim cutouts 28 or the pot pouring region openings 25, resulting in the lid skirt solid regions 38 to be aligned with the pot pouring region openings 25. Rotation of lid 30 in any direction will result in the pot rim flange 60 being disposed inside of the lid locking flanges 70, locking the lid 30 to the pot 20, and alignment of the lid skirt draining regions 40 and 50 and the pot pouring region openings 25.

Figure 4D:
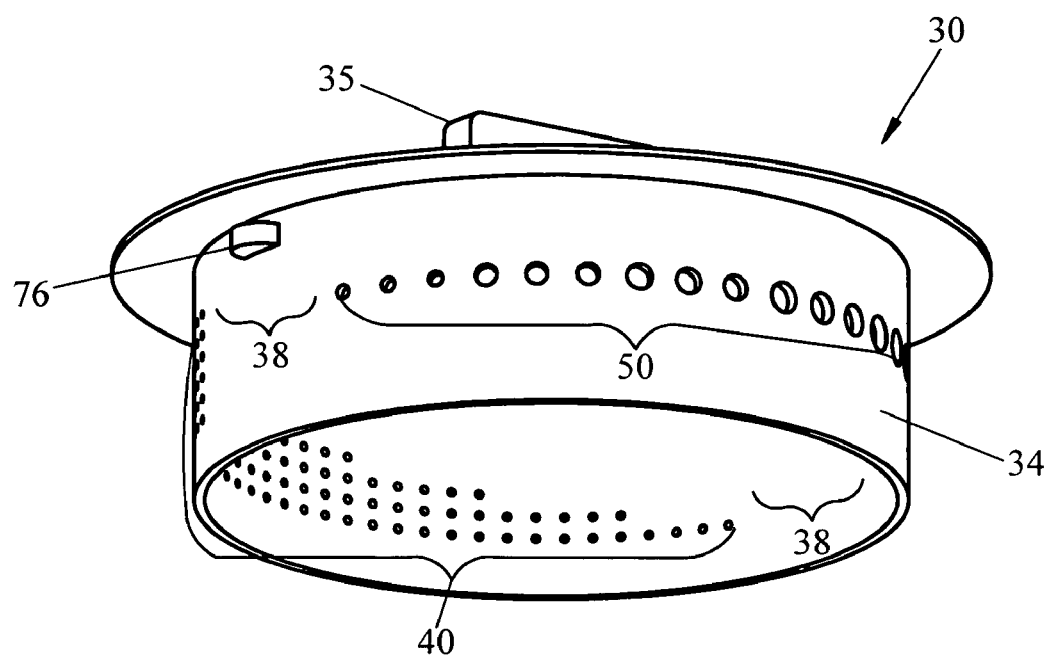
FIG. 4D shows a perspective view of the pot and the lid locking mechanism fourth embodiment.
Figure 4D:
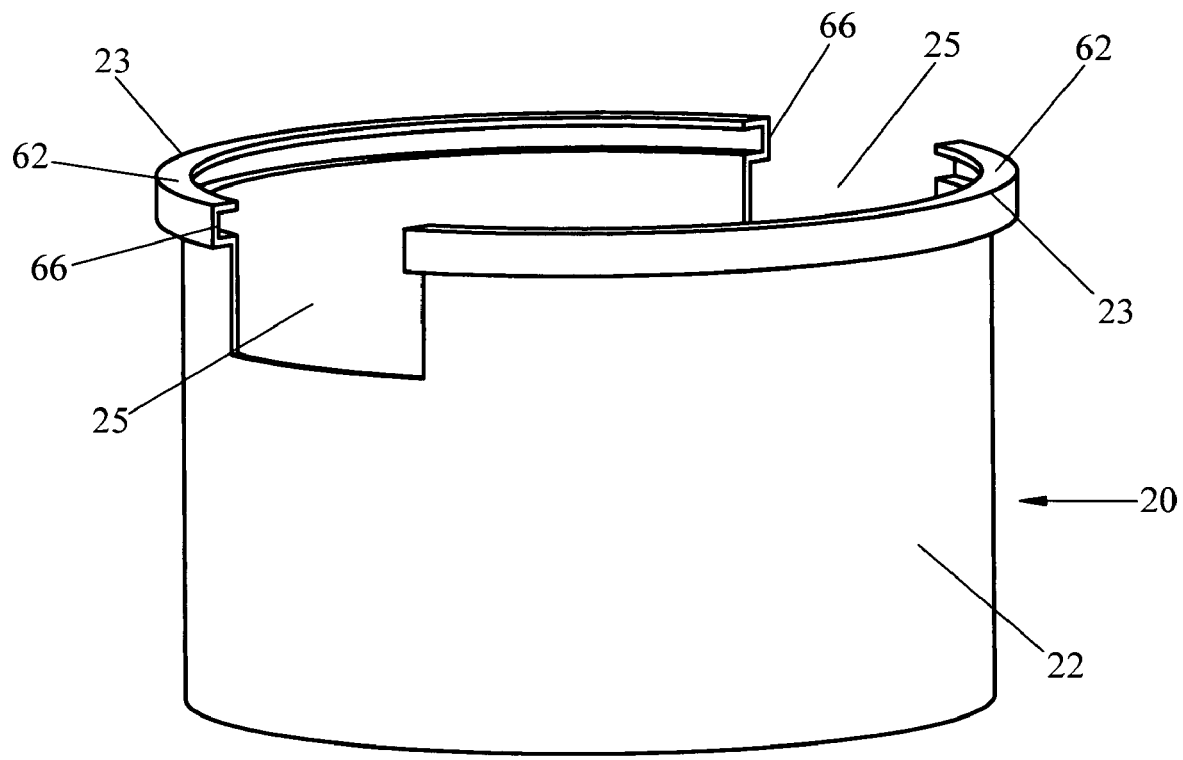

The fourth embodiment of the automatic locking mechanism applies to the lid embodiment illustrated in FIGS. 2C and 2D and the pot embodiments illustrated in FIGS. 1A, 1B, 1C, 1D, and 1E. FIG. 4D illustrates an example of this embodiment which includes the locking mechanism of the lid depicted in FIGS. 2C and 2D and the pot depicted in FIG. 1A. The lid locking component includes outwardly protruding locking tabs 76 located slightly below the top of the lid skirt solid regions 38. The pot locking component includes inward flanges 62 of the pot rim 23 forming protrusion channels 66. The pot pouring regions can be located at the pot rim 23 as illustrated in FIGS. 1A, 1C, and 1D or below the pot rim 23.

If the pot pouring regions are located below the pot rim 23 as illustrated in FIGS. 1B and 1E, the pot rim cutouts 28 are necessary above the pot pouring regions. The positions of the lid locking tabs 76 must correspond to the positions of the pot rim cutouts 28 or the pot pouring region openings 25. The number of the lid locking tabs 76 may be less or equal to the number of the pot pouring region openings 25, although, at least one lid locking tab 76 is required for the locking mechanism to work. Although FIG. 4D illustrates two lid locking tabs 76 and two pot pouring region openings 25, one or more than two of each can be made if desired. In the opened position, when the lid 30 is placed on the pot 20, the lid skirt 34 is nested inside of the pot wall 22 with the lid locking tabs 76 positioned inside of the pot pouring region openings 25 or inside of the pot cutouts 28 resulting in the lid skirt solid regions 38 to be aligned with the pot pouring region openings 25. Rotation of the lid 30 in any direction will position the lid locking tabs 76 inside of the pot protrusion channel 66 resulting in locking the lid 30 to the pot 20 and alignment of the lid skirt draining regions 40 and 50 and the pot pouring region openings 25.

Figure 4E:
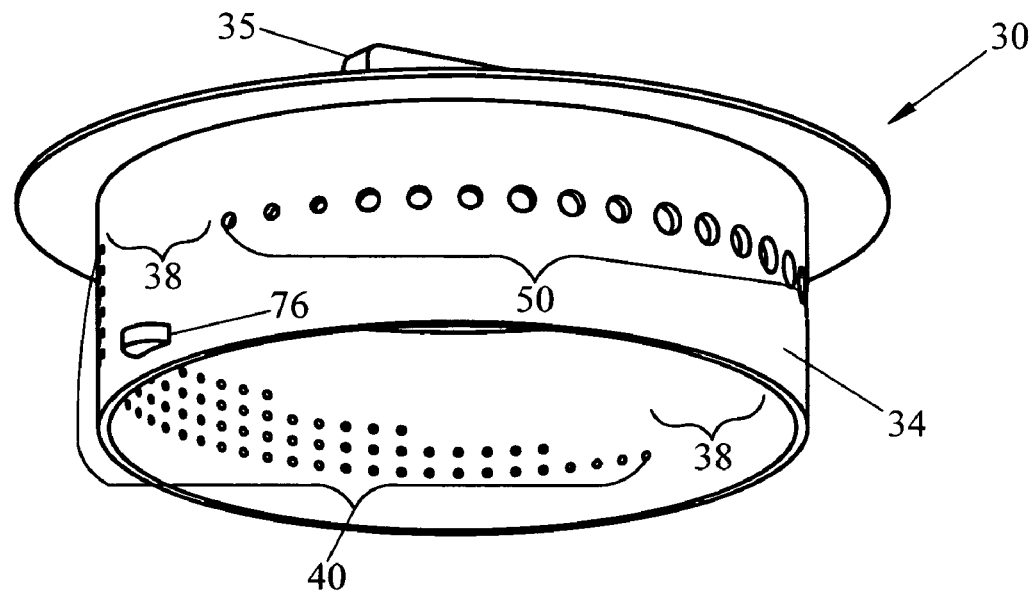
FIG. 4E shows a perspective view of the pot and the lid locking mechanism fifth embodiment.
Figure 4E:
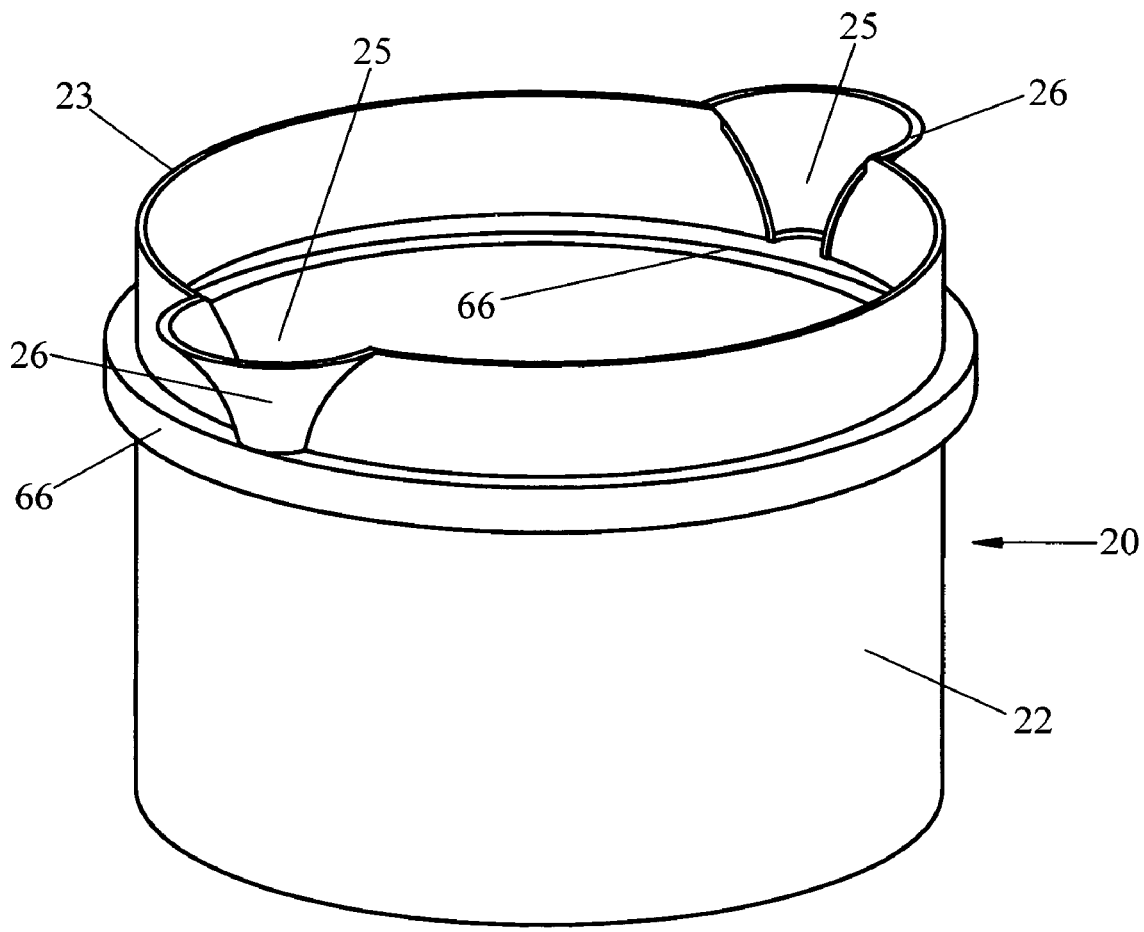
Figure 5A:
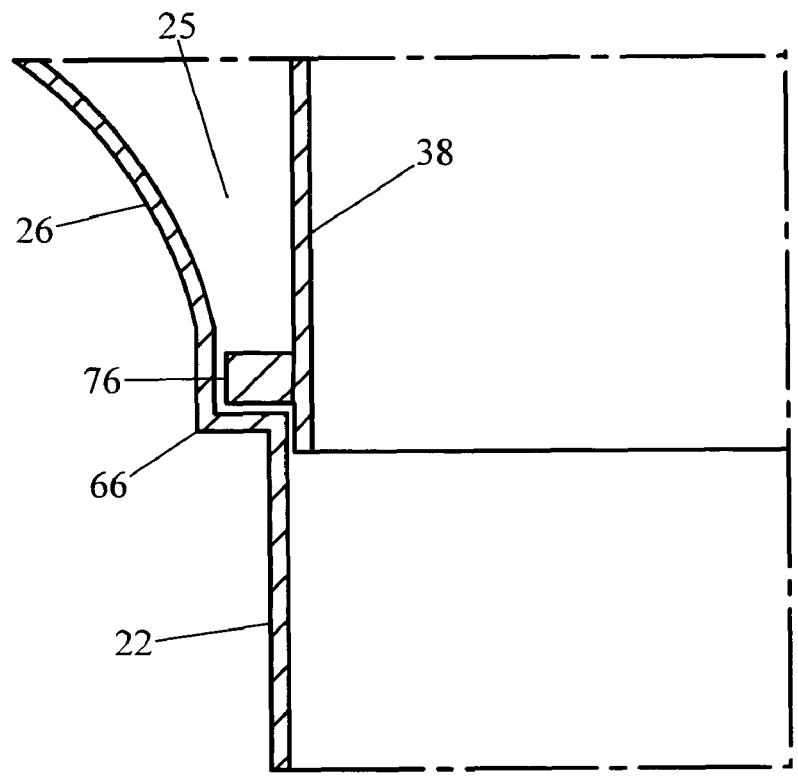
FIG. 5A shows a partial cross-sectional view of the lid locking tab and the pot pouring region depicted in FIG. 4E demonstrating an opened position.
Figure 5B:
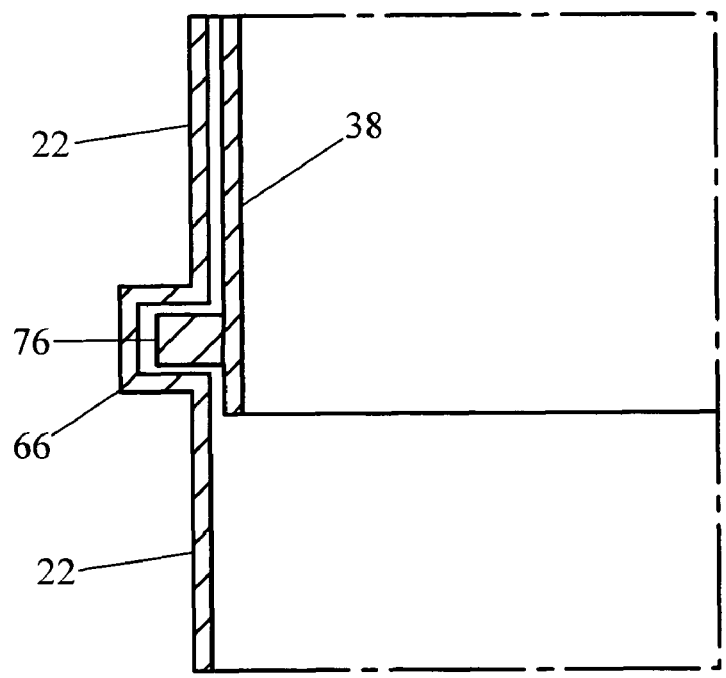
FIG. 5B shows a partial cross-sectional view of the lid locking tab and the pot protrusion channel depicted in FIG. 4E demonstrating a locked position.

The fifth embodiment of the automatic locking mechanism applies to the lid embodiment illustrated in FIGS. 2C and 2D and the pot embodiments illustrated in FIGS. 1A, 1C, and 1D. FIG. 4E illustrates an example of this embodiment which includes the locking mechanism of the lid depicted in FIGS. 2C and 2D and the pot depicted in FIG. 1C. The lid locking component includes outwardly protruding locking tabs 76 located slightly above the bottom of the lid skirt solid regions 38. The pot locking component includes a protrusion channel 66 in the pot wall 22 communicating with the pot pouring region openings 25. The number of the lid locking tabs 76 may be less or equal to the number of pot pouring region openings 25, although, at least one lid locking tab 76 is required for the locking mechanism to work. Although FIG. 4E illustrates two lid locking tabs 76 and two pot pouring region openings 25, one or more than two of each can be made if desired. In the opened position, when the lid 30 is placed on the pot 20, the lid skirt 34 is nested inside of the pot wall 22 with the lid locking tabs 76 positioned inside of the pot pouring region openings 25 (best seen in FIG. 5A), resulting in the lid skirt solid regions 38 to be aligned with the pot pouring region openings 25. Rotation of the lid 30 in any direction will position the lid locking tabs 76 inside of the pot protrusion channel 66 (best seen in FIG. 5B) resulting in locking the lid 30 to the pot 20 and alignment of the lid skirt draining regions 40 and 50 and the pot pouring region openings 25.

The lid includes a lid operator to facilitate positioning the lid on the pot, adjusting it for required draining and vapor escape, and lifting it off the pot. The lid operator can be implemented as one or more lid handles; or the lid itself can be shaped to provide the operator function. For instance, FIG. 6A demonstrates one of the embodiments of the lid functioning as a lid operator, where the handle 35 of the lid 30 is a protruded part from the lid surface 37. The lid surface and/or the lid operator surface may include markings comprising arrows, symbols, text word, etc. The markings and/or the lid operator position indicate an opened or locked position when aligned with the pot pouring regions. An additional way of indicating an opened or locked position is having a color coded pot and lid. The area beneath the pot pouring regions is marked by a desirable color. The lid surface solid regions or the lid surface above the lid skirt solid regions is marked by the same color. Indication of an opened position is when the colors from both the pot and the lid are aligned with each other and indication of a locked position is when the colors from the pot and the lid are not aligned.

Figure 6A:
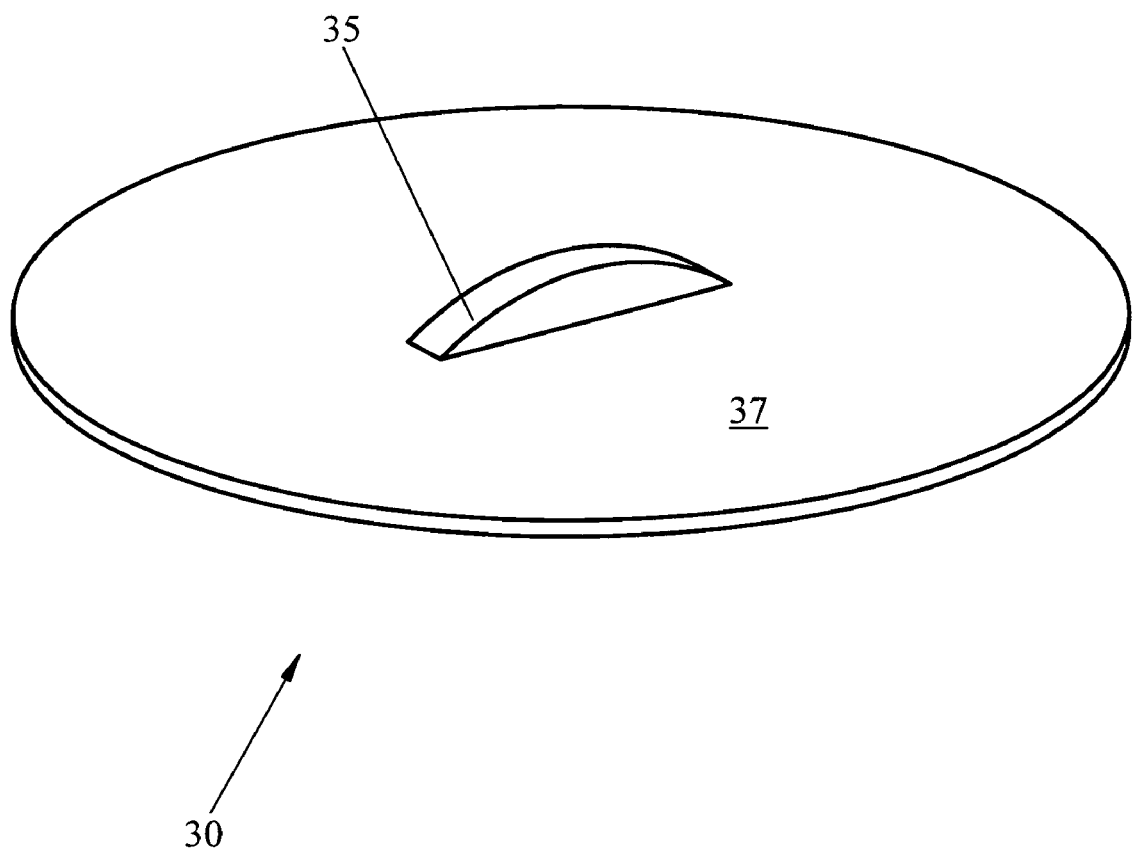
FIG. 6A shows a perspective view of a lid handle created as a result of the lid protrusion.
Figure 6B:
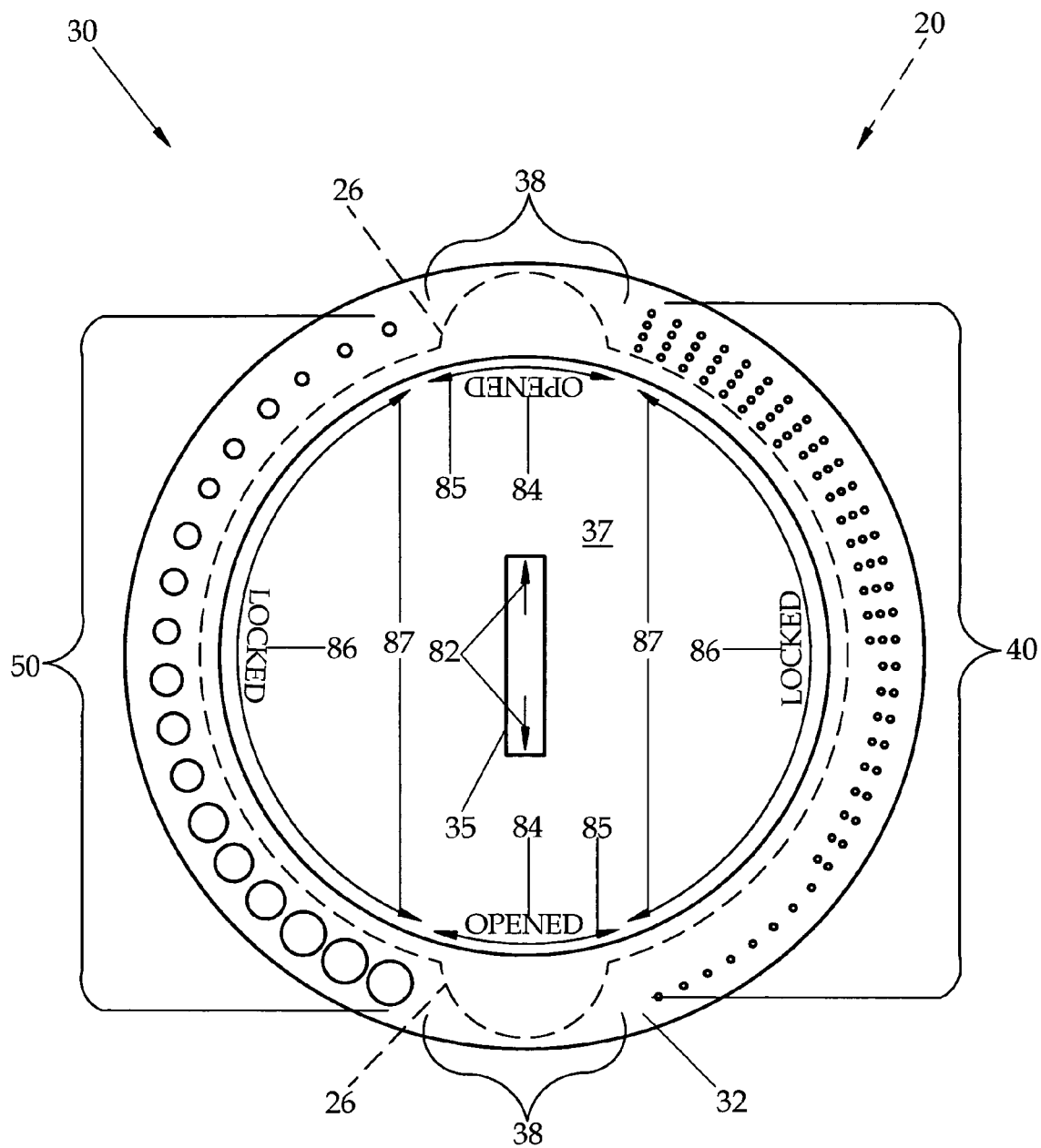
FIG. 6B is demonstrating markings in a top view of the lid depicted in FIGS. 2A and 2B placed on top of the pot depicted in FIG. 1C.

For exemplary purposes, FIG. 6B illustrates a top view of the lid 30 from FIGS. 2A and 2B. The lid handle 35 is positioned in the center of the lid 30 with the longest dimension positioned toward the lid solid regions 38. The lid handle 35 also includes pointing arrows 82 directed toward the lid solid regions 38. The lid 30 includes additional markings comprising arrows and text words positioned on the lid periphery 32 indicating locked and unlocked positions. The text word "OPENED" 84 surrounded by opened arrows 85 indicates the solid regions 38; and the text word "LOCKED" 86 surrounded by locked arrows 87 indicates the draining regions 40 and 50. The lid handle 35 and the pointing arrows 82 are directed toward the pot pouring region lips 26 when the lid 30 is in the opened position and the word "OPENED" 84 with opened arrows 85 is positioned above the pot pouring region lips 26. When the lid 30 is in the locked position, only the word "LOCKED" 86 with locked arrows 87 is positioned above the pot pouring region lips 26.

Although the draining and solid regions of the lid second embodiment illustrated in FIGS. 2C and 2D are located on the lid skirt, the lid handle and the lid markings are still located on the lid periphery laid out in the same fashion as described in paragraph but indicating the draining and solid regions below.

The pot can be placed upside down in the locked position if the lid handle is not present, detached, folded, or leveled by other means with the lid outer surface. In this case, draining can be facilitated without using hands. During draining the pot may be shaken at times to unblock the draining regions in order to release the remaining liquid or particles. This will permit users to attend to other matters if necessary. This upside down method of draining is supported by both of the lid embodiments illustrated in FIGS. 2A-2D. Although in the case of the first embodiment (FIGS. 2A and 2B), the lid must be placed on a raised surface which will not block the lid draining regions.

The pot and the lid draining apparatus can be created, for instance, from numerous combinations comprising the five sample pot embodiments (FIGS. 1A-1E) and two sample lid embodiments (FIGS. 2A-2D) using one of the five sample locking mechanism embodiments (FIGS. 4A-4E). The permissible combinations of the sample embodiments were described in paragraphs [0066]-[0070]. For illustrative purposes, three of these combinations are depicted in FIGS. 7, 8, and 9.

Figure 7:
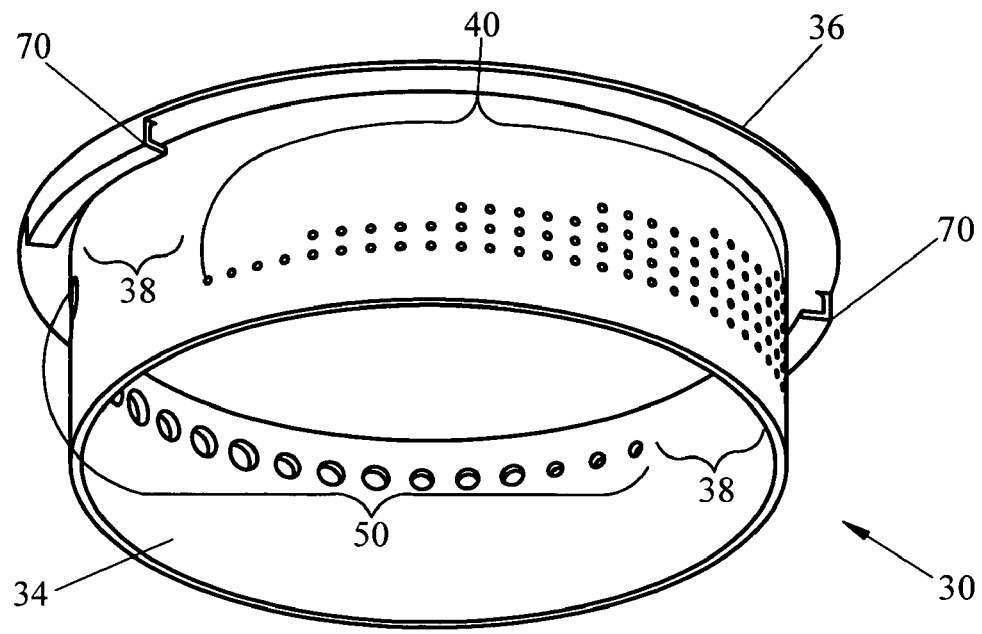
FIG. 7 shows a perspective view of a cookware sample embodiment which includes a combination of the pot embodiment depicted in FIG. 1E, the lid embodiment depicted in FIGS. 2C and 2D, and the locking mechanism embodiment depicted in FIG. 4C.
Figure 7:
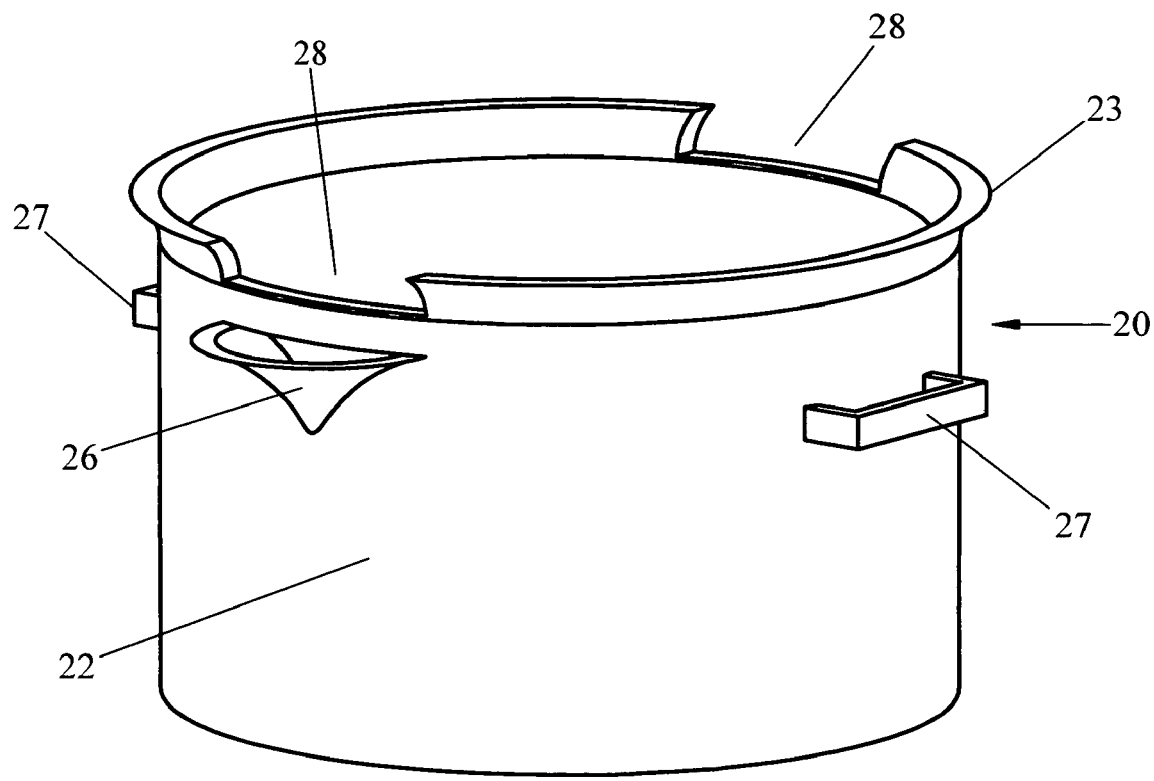

FIG. 7 illustrates a cooking apparatus as a pot 20 and a lid 30 comprising a pot embodiment demonstrated in FIG. 1E and a lid embodiment demonstrated in FIGS. 2C and 2D using an automatic locking mechanism demonstrated in FIG. 4C. For illustrative purposes, the pot 20 includes two pot handles 27 and only one pot pouring region lip 26.

Figure 8:
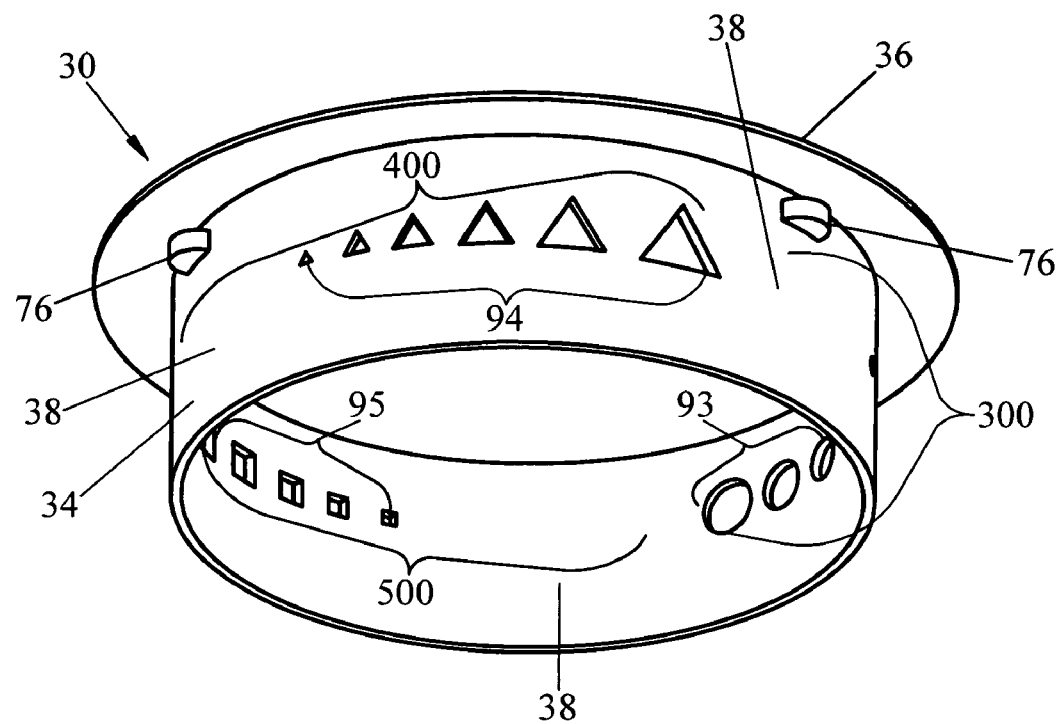
FIG. 8 shows a perspective view of a cookware sample embodiment which includes a combination of the pot embodiment depicted in FIG. 1D, the lid embodiment depicted in FIGS. 2C and 2D, and the locking mechanism embodiment depicted in FIG. 4D.
Figure 8:
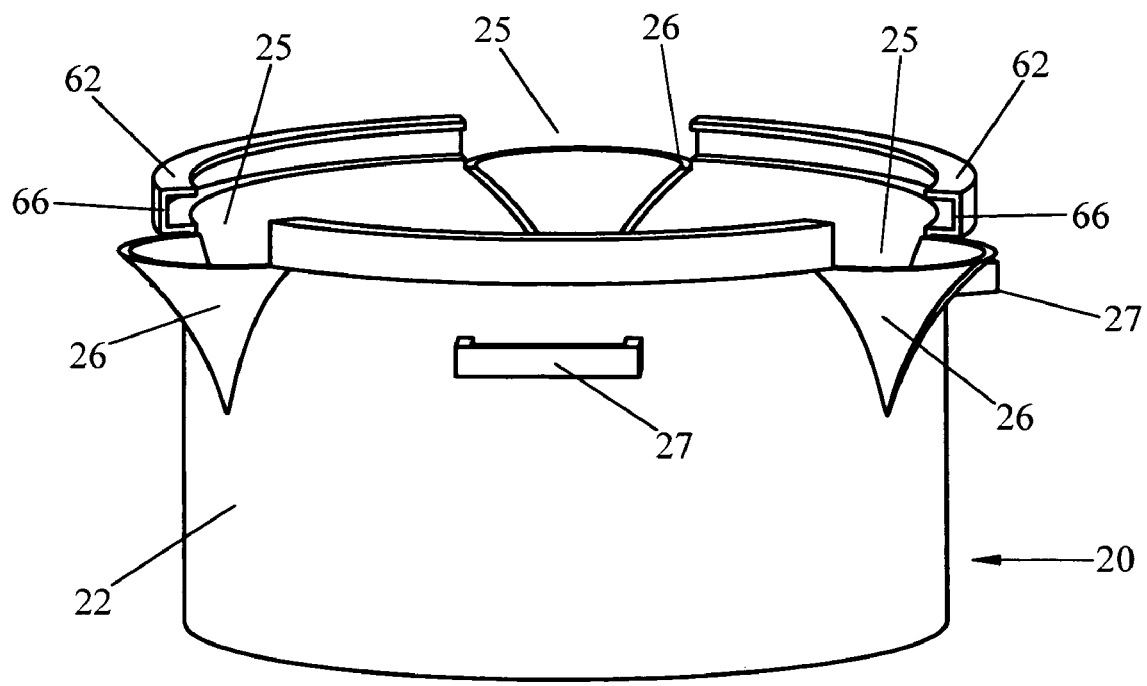

FIG. 8 illustrates a cooking apparatus as a pot 20 and a lid 30 comprising a pot embodiment demonstrated in FIG. 1D and a lid embodiment demonstrated in FIGS. 2C and 2D using an automatic locking mechanism demonstrated in FIG. 4D. For illustrative purposes, the pot 20 includes three pot handles 27 and three pot pouring region lips 26. The lid 30 includes three locking tabs 76 and three functional units 300, 400, and 500. The functional unit 300 includes a draining region 93 having circular openings. The functional unit 400 includes a draining region 94 having triangular openings. The functional unit 500 includes a draining region 95 having square openings. The size of the openings of each draining region 93, 94, and 95 is increased gradually in order to release approximately the same vapor escape and drainage amount from each of the pot pouring region lips 26 at any locked position.

Figure 9:
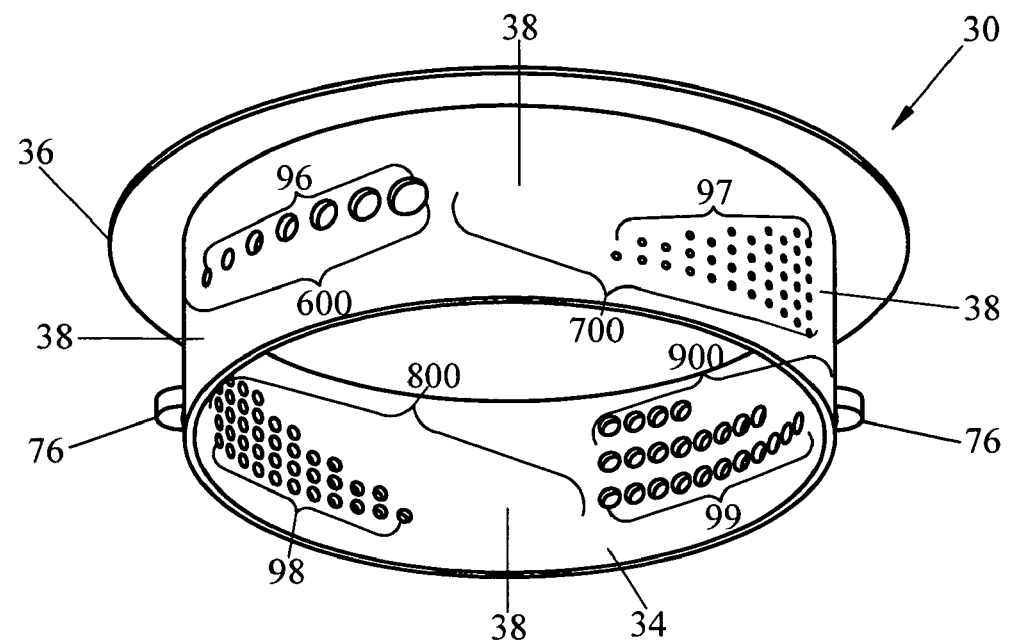
FIG. 9 shows a perspective view of a cookware sample embodiment which includes a combination of the pot embodiment depicted in FIG. 1C, the lid embodiment depicted in FIGS. 2C and 2D, and the locking mechanism embodiment depicted in FIG. 4E.
Figure 9:
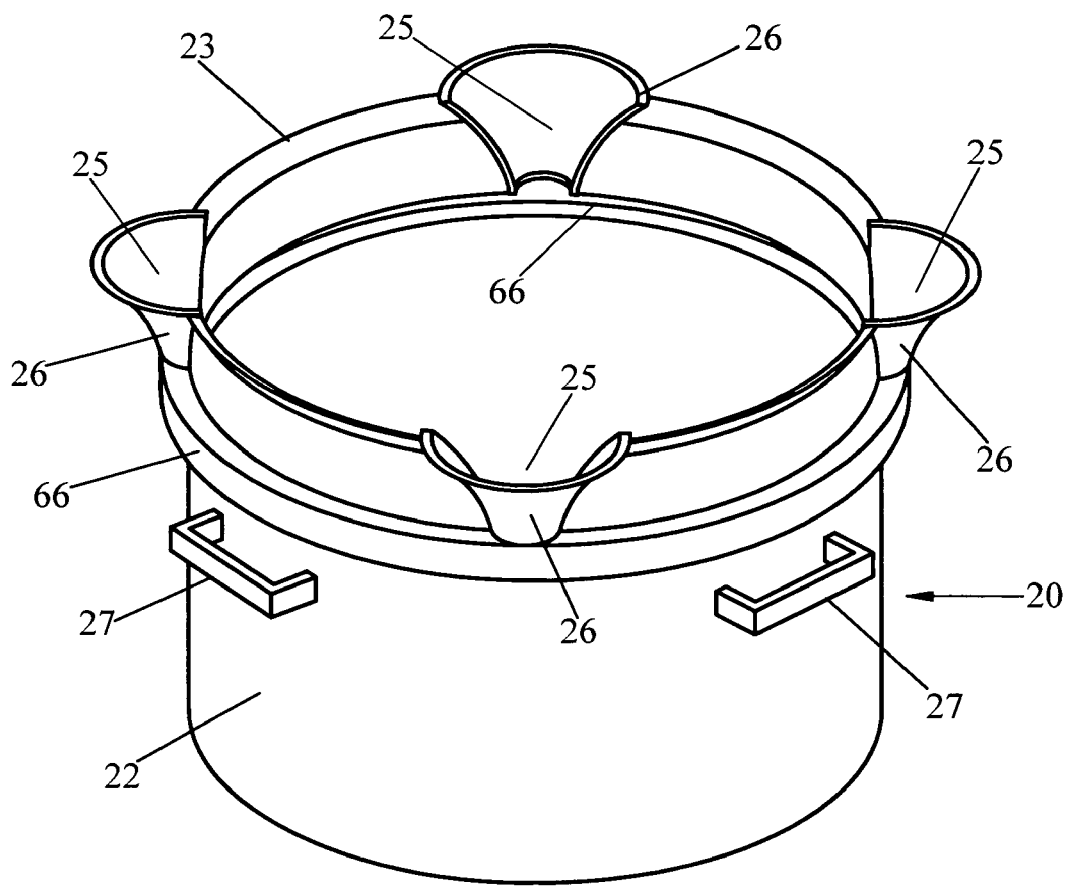

FIG. 9 illustrates a cooking apparatus as a pot 20 and a lid 30 comprising a pot embodiment demonstrated in FIG. 1C and a lid embodiment demonstrated in FIG. FIGS. 2C and 2D using an automatic locking mechanism demonstrated in FIG. 4E. For illustrative purposes, the pot 20 includes four pot handles 27 and four pot pouring region lips 26. The lid 30 includes two locking tabs 76 and four functional units 600, 700, 800, and 900 including draining regions 96, 97, 98, and 99, with each draining region differing in opening sizes. The combined size of the openings of each draining region 96, 97, 98, and 99 is increased gradually in order to release approximately the same vapor escape and drainage amount from each of the pot pouring region lips 26 at any locked position. Larger variety of drainage openings allows for more flexibility in filtering particles and drainage speed.

Those who are skilled in the art will readily perceive how to modify the invention. Therefore, the appended claims are to be construed to cover all equivalent structures which fall within the scope and spirit of the invention.

What is claimed is:

1. An adjustable draining apparatus, comprising:
   a) a vessel, said vessel comprises at least one solid wall defining a hollow region, at least one vessel locking member, and a vessel handling means for moving and holding said adjustable draining apparatus by a user, said solid wall comprises a circular vessel rim defining a loading opening of a predetermined size for placing contents into said vessel and removing from said vessel and at least one pouring opening of predetermined shape and size for pouring said contents out of said vessel when said vessel is tilted, any of said at least one pouring opening chosen by a user for pouring out said contents from said vessel is defined as a selected pouring opening;
   b) a lid capable of covering said loading opening, said lid comprises a lid handling means, at least one lid locking member, at least one draining region, and at least one solid region,
   said lid handling means is for placing said lid on said circular vessel rim by a user for covering said loading opening, for removing said lid from said vessel by a user, and for rotating said lid by a user when said lid is covering said loading opening, said lid is configured to rotate freely about said vessel regardless of user strength,
   said at least one draining region and said at least one solid region are located circumferentially one after another in such way that each of said at least one draining region is surrounded on both ends along the circumference by said at least one solid region, each of said at least one draining region and each of said at least one solid region is further located for aligning once with each of said at least one pouring opening when said lid is rotated three hundred sixty degrees,
   the locations of said at least one draining region and said at least one solid region are also predetermined for said at least one solid region to be able to block each of said at least one pouring opening in a blocking position of said lid about said vessel, each of said at least one draining region comprises at least one draining opening of predetermined shape and size, a degree of vapor escape through said at least one pouring opening is predetermined by size and shape of said at least one draining opening aligned with said at least one pouring opening,
   said at least one draining opening aligned with said selected pouring opening defines a draining position, a degree of draining, particle filtering, and vapor escape through said selected pouring opening in said draining position is predetermined by size and shape of said at least one draining opening,
   each of said at least one draining opening is located in a predetermined way to provide a plurality of the draining positions within each of said at least one draining region aligned with said selected pouring opening, each of said at least one draining opening is also located within each of said at least one draining region in such way that alignment of any portion of any of said at least one draining region with said selected pouring opening results in one of said draining positions and that alignment of different portions of the same draining region with said selected pouring opening results in different draining positions, whereby a user is able to continuously adjust a degree of vapor escape by keeping said at least one draining region aligned with said at least one pouring opening without returning to said blocking position and to continuously adjust a degree of draining and particle filtering by keeping said at least one draining region aligned with said selected pouring opening without returning to said blocking position,
   each of said at least one lid locking member is located in a predetermined way for aligning once with each of said at least one vessel locking member when said lid is rotated three hundred sixty degrees,
   any of said at least one lid locking member and any of said at least one vessel locking member capable of preventing intentional or accidental removal of said lid from said vessel regardless of orientation of said adjustable draining apparatus when aligned with each other are defined as complementary locking members, locations of said complementary locking members are predetermined for aligning with each other when any of said at least one draining opening is aligned with any of said at least one pouring opening, whereby despite said lid being locked to said vessel and regardless of user presence, an explosion which may be caused by potential vapor accumulation is prevented due to exposure of said contents to the outside environment through the aligned openings regardless of which of said at least one pouring opening is selected by user for draining or particle filtering,
   at least one of said complementary locking members being a circumferentially shaped member, any of the locking members complementary to said circumferentially shaped member is configured to remain aligned with said circumferentially shaped member within the circumference of said circumferentially shaped member, the length of the circumference of said circumferentially shaped member is predetermined for preventing intentional or accidental removal of said lid from said vessel by said complementary locking members regardless of orientation of said adjustable draining apparatus while any of said at least one draining region remains aligned with said selected pouring opening, whereby uncontrollable loss of said lid and said contents is eliminated in any of said draining positions at any orientation of said adjustable draining apparatus,
   the aligned complementary locking members are disposed such that said lid can rotate freely about said vessel when said vessel is not tilted and when said lid is not urged from said vessel by a user, whereby any user is able to easily rotate said lid about said vessel regardless of personal strength when choosing one of said draining positions or said blocking position, the locations of said complementary locking members are further predetermined in such way that they are not aligned with each other in said blocking position, whereby due to said lid being unlocked from said vessel, an explosion which may be caused by potential vapor accumulation in said blocking position is eliminated regardless of user presence since vapor is able to find its way out.

2. The adjustable draining apparatus of claim 1, wherein said lid further comprises predetermined markings for indicating one of said draining positions or said blocking position when said markings are aligned with said selected pouring opening.

3. The adjustable draining apparatus of claim 1, wherein said lid handling means is also for indicating one of said draining positions or said blocking position when aligned with said selected pouring opening.

4. The adjustable draining apparatus of claim 1, wherein said lid is further configured for upside-down draining in any of said draining positions without using hands, whereby a user is able to attend to other matters when draining and particle filtering.

5. The adjustable draining apparatus of claim 1, wherein said lid handling means is further for moving and holding said adjustable draining apparatus in any of said draining positions by a user, whereby a user has one more option for handling said adjustable draining apparatus in any of said draining positions in addition to said vessel handling means.

6. The adjustable draining apparatus of claim 1, wherein said vessel further comprises directing means for directing draining in any of said draining positions.

7. The adjustable draining apparatus of claim 1, wherein said at least one draining opening is furthermore located for adjusting a degree of vapor escape gradually through said at least one pouring opening without returning to said blocking position and for adjusting a degree of draining and particle filtering gradually within each of a predetermined number of said at least one draining region aligned with said selected pouring opening without returning to said blocking position.

* * * * *